Aug. 25, 1925.
H. LUBÉ
1,551,037
MOTION PICTURE PROJECTOR
Filed March 23, 1923 5 Sheets-Sheet 5
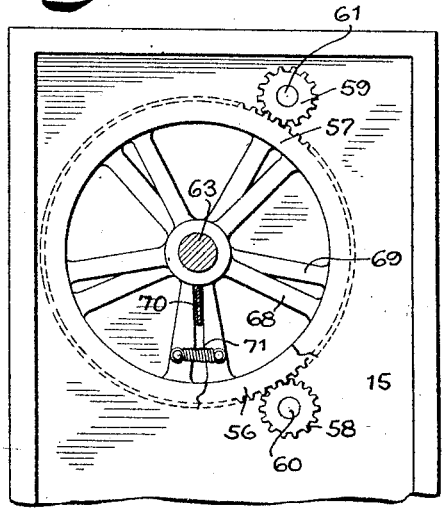
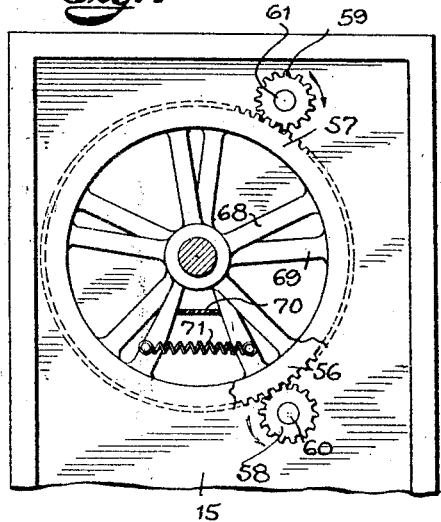
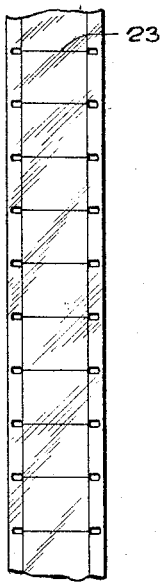
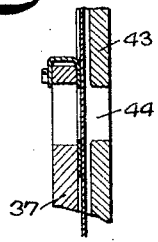
INVENTOR
Harry Lubé
BY
Townsend Decker
ATTORNEYS Patented Aug. 25, 1925.

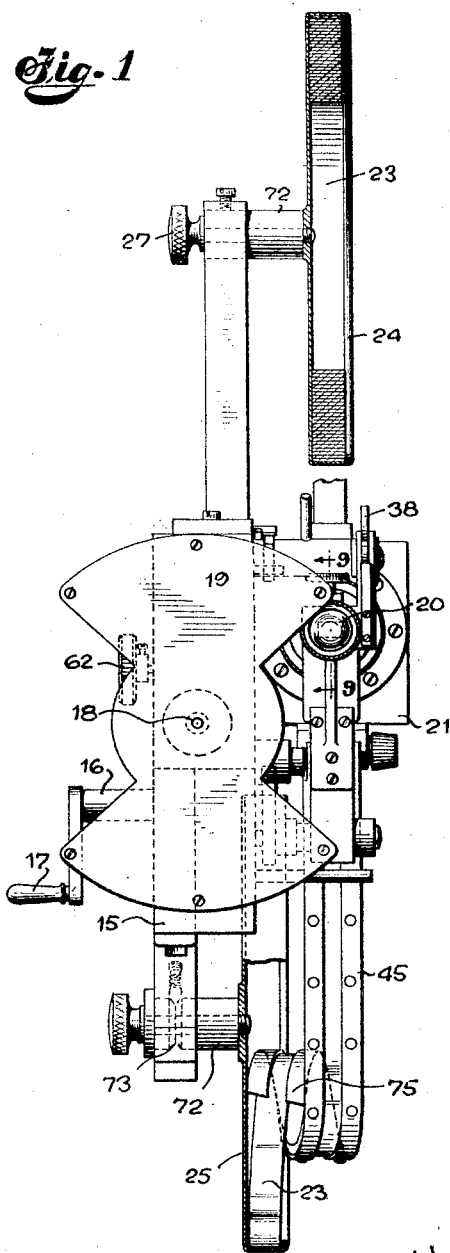

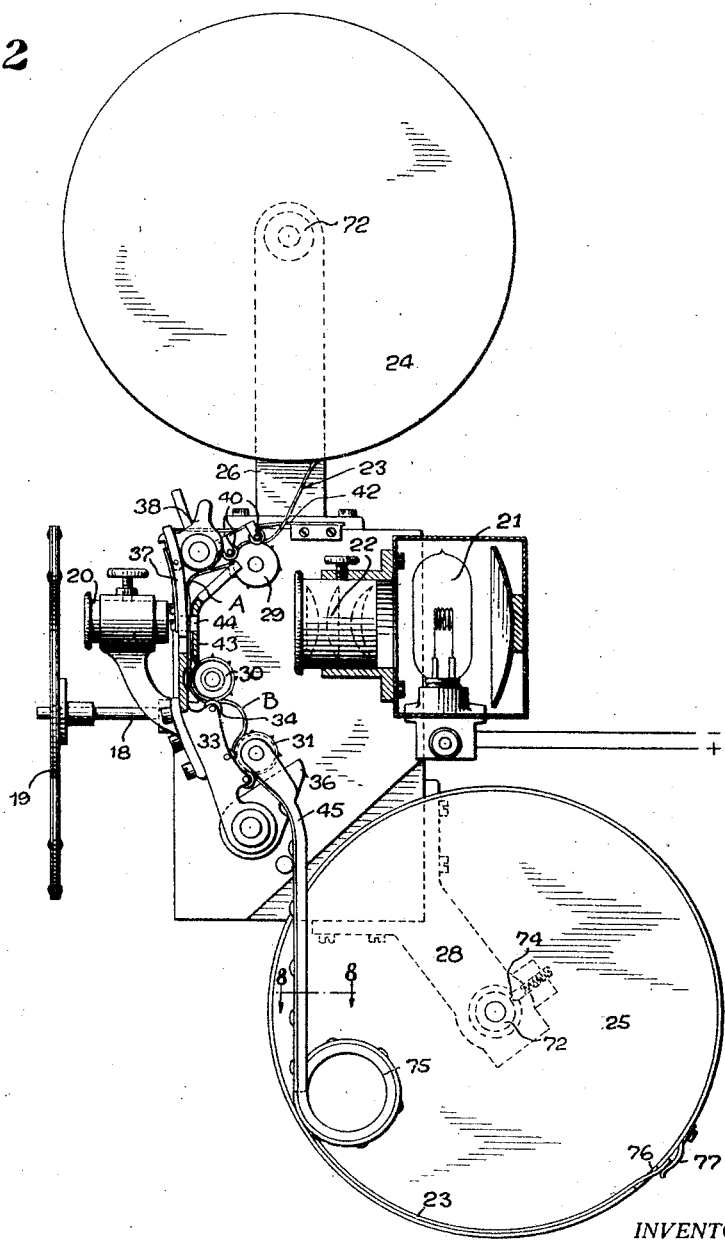

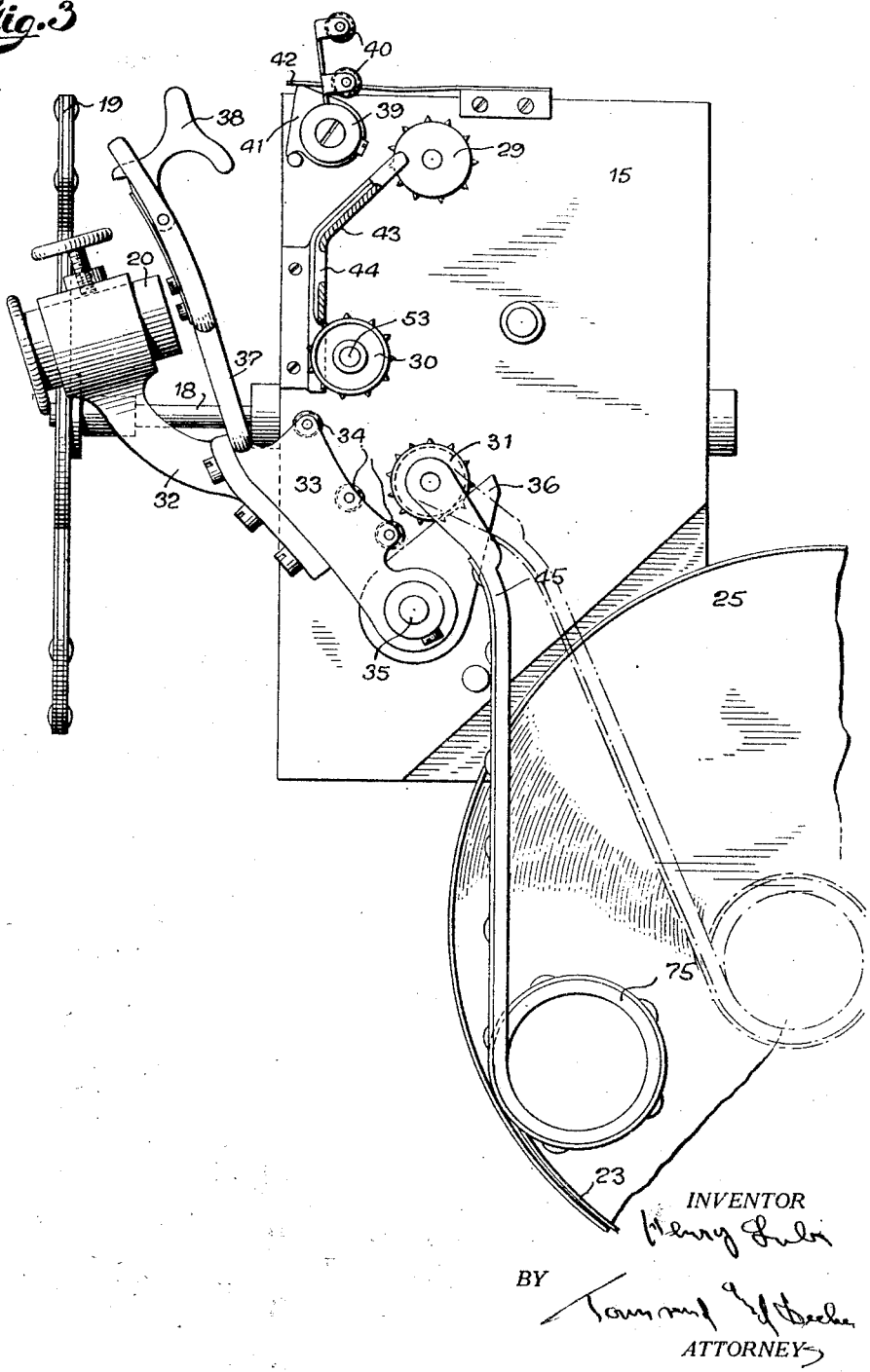

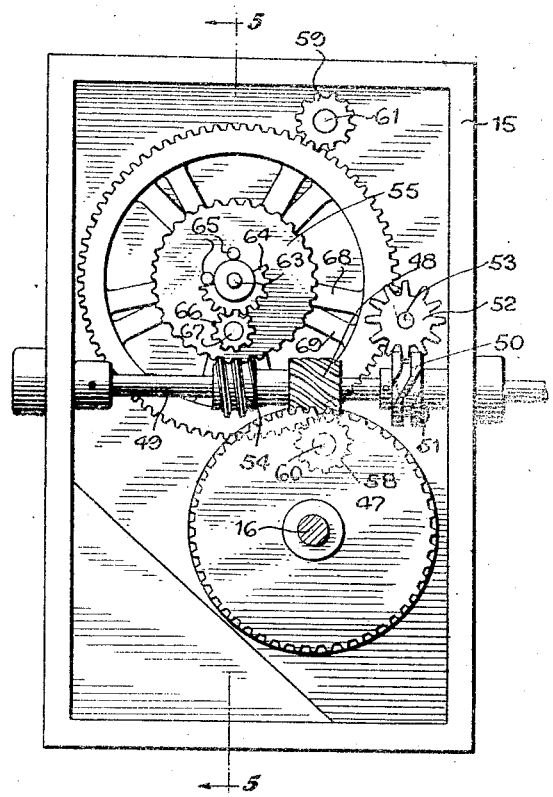
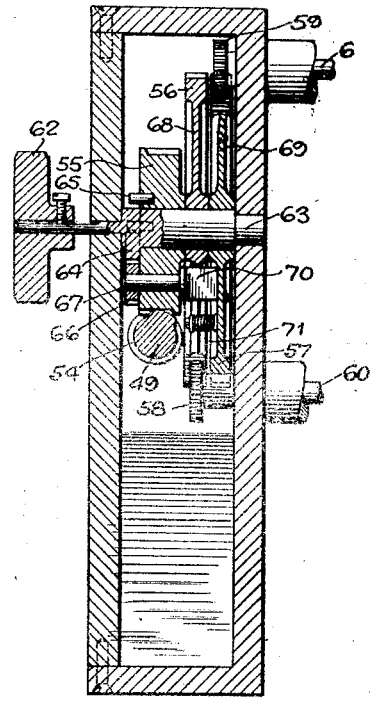

1,551,037

UNITED STATES PATENT OFFICE.

HENRY LUBÉ, OF COLLEGE POINT, NEW YORK, ASSIGNOR TO RADIO MOTION PICTURE PHON. CORP., OF LONG ISLAND CITY, NEW YORK, A CORPORATION OF MASSACHUSETTS.

MOTION-PICTURE PROJECTOR.

Application filed March 23, 1923. Serial No. 627,067.

*To all whom it may concern:*

Be it known that I, HENRY LUBÉ, a citizen of the United States, and a resident of College Point, L. I., in the county of Queens and State of New York, have invented certain new and useful Improvements in Motion-Picture Projectors, of which the following is a specification.

My invention relates to a motion picture projector and aims to provide a device of this character presenting certain improvements over articles of this type as heretofore placed upon the market.

It is a well appreciated fact that the conventional motion picture projectors have not been adaptable for amateur work for a number of reasons. Among the major difficulties experienced in this connection there has first been the question of cost, which is necessarily high, due to the manufacturing expenses of a machine of this nature; secondly, the relatively complicated mechanism which has been employed for feeding the film has rendered it necessary that the operator of the machine be fully conversant with all details of the same and this difficulty has been virtually insurmountable where the amateur in question was not technically inclined; thirdly, it has been found that the average amateur will often forget to form the necessary loops in advance and to the rear of the intermittent mechanism and where these loops have been omitted the film is necessarily broken immediately upon the mechanism being operated. Also, with regard to the film, it has been noted particularly where the same has been broken or has run off of the feeding rollers that the amateur operator has great difficulty in re-threading the film properly and in applying the same to the mechanism in such a manner that the exposures of the film will properly align with the light opening.

With these and further difficulties in mind, my present invention has for its primary object, the production of a film projecting machine for use in connection with motion pictures and which is particularly intended for use by amateurs, although the same is obviously not necessarily limited to that use, said machine being capable of being produced at but a fraction of the cost of a commercial and conventional projector.

A further object of my invention resides in the construction of a device of the character stated in which mechanical complication will be reduced to a minimum, so that it will not be necessary for a person to be technically trained in order to successfully operate this machine.

A still further object of the present invention is that of constructing a projector in which it will not be necessary to form the loops in the usual way, this operation being accomplished in a semi-automatic manner. Thus, the breakage of films incident to this difficulty will be entirely overcome.

Another object of my invention is that of constructing a projecting machine, in which the operator will experience no difficulty in threading the film therethrough and in which, further, it will be impossible to apply the film to the mechanism in such a manner that the exposure thereof will fail to register properly with the light opening.

Still another object of my invention is that of furnishing a projector embodying the foregoing characteristics and which will be constructed in such a manner as to overcome the necessity of rewinding the film after its projection, it being noted in this connection, that the reels will be of a construction different from those usually employed and that the same will be of a far simpler type than has heretofore been regarded as possible.

Among other objects of this invention is that of constructing a projector capable of being operated with the expenditure of a small amount of energy.

With these and further objects in mind reference is had to the attached sheets of drawings wherein there is illustrated one practical embodiment of my invention and it will be seen in these drawings that:

Fig. 1 is a partly sectional front view of a projector embodying my improved construction.

Fig. 2 is a partly sectional side view thereof and showing the mechanism in its operative position.

Fig. 3 is an enlarged fragmentary side elevation of certain of the parts as shown in Figure 2 but illustrating the position which these parts assume when the mechanism is in its open position.

Fig. 4 is a side view of the driving mechanism housed within the projector.

Fig. 5 is a transverse sectional view taken along the lines 5—5 and in the direction of the arrows in Figure 4.

Fig. 6 is a view similar to Figure 4 but showing certain of the upper mechanism removed to disclose the underlying construction.

Fig. 7 corresponds to Figure 6 but shows the parts in a different position than that shown in the aforementioned figure.

Fig. 8 is a sectional view taken along the lines 8—8 of Figure 2.

Fig. 9 is an enlarged sectional view taken along the lines 9—9 and in the direction of the arrows indicated in Figure 1, and Fig. 10 is a face view of a portion of the film which I preferably employ in connection with the projector.

In the present embodiment of the invention it will be noted that the projector embraces a casing 15 from which a shaft 16 extends, the latter having its inner end connected with the driving mechanism (hereinafter more fully described) while a crank 17 is attached to its outer end. Operatively connected with the mechanism within the casing is a second shaft 18 and to the outer end of this shaft a shutter 19 is attached, this member being disposed in such a manner that when the shaft 18 is rotated the wings of the shutter will intersect the path of the light rays emerging from the projector lens 20.

In line with the lens 20 is a bulb 21 and a suitable condenser lens assembly 22 may be interposed between the bulb 21 and the projector lens so that a proper light beam will be produced, which beam will serve to illuminate one of the exposures upon the film 23 as the latter passes from the feeding reel 24 to the receiving reel 25. It is here to be noted, that although these reels may be supported in any desirable manner, I prefer to associate the same with the projector by utilizing a standard 26 to the outer end of which the reel 24 is clamped by any suitable means, such as, a set screw 27, while the lower reel 25 is offset with respect to the projector mechanism by utilizing a laterally extending standard 28 which rotatably supports the same, the purpose of this construction being hereinafter more fully brought out.

Referring now to the exterior intermittent feed and film guiding mechanism, it will be seen, reference being had to Figure 3 in which these parts are probably best illustrated, that I prefer to utilize merely three sprockets which have been designated by the reference numerals 29, 30 and 31 respectively. The first of these members forms what is commonly known as the feed sprocket and the third furnishes a take-up sprocket, it being thus obvious that the first of these members will serve to feed the film from the reel 24 to the intermittent sprocket 30, which latter will move the film in the necessary manner to produce the illusion of motion on the part of the light image, while the third sprocket will take-up the film which has passed the light opening and feed the same toward the receiving reel 25.

In order to maintain the film properly applied on these sprockets and with a view of reducing mechanical complication to a minimum, it will be noted that the projector lens 20 is preferably carried by a bracket 32 which is in turn attached to a channel member 33. Rotatably supported adjacent the outer edges of this member and between the side walls of the same, are a series of rollers 34 which, when the member 33 is swung around the stub shaft 35 to the position shown in Figure 2, cause the film 23 to be pressed against the sprockets 30 and 31 so that the feed perforations of the film operatively engage the teeth of the latter. In order to prevent the channel member 33 and the parts associated therewith from swinging to too great an extent, i. e. past the position shown in Figure 3, I may utilize a tongue 36 which, acting in conjunction with a certain portion of the sprocket 31 operates as a stop for this member. However, to normally retain the parts in their operative positions, i. e. that shown in Figures 1 and 2, it will be noted that a second bracket 37 is attached to the member 33 and pivotally carries at its upper end a spring pressed hasp 38 which is adapted to rest within and engage the base of a groove formed in a pin 39 attached to the casing 15. This pin carries a pair of rollers 40 which are normally retained in the position shown in Figure 2 by preferably utilizing a cam member 41 attached to the pin 39 and a spring 42 which co-operates with the said cam member.

Thus, it will be obvious that the film will be held in engagement with the sprocket 29 by means of the rollers 40 and the feed perforations of the film will be engaged by the teeth of the said sprocket, which will pass the film along the track 43, past the light opening 44 formed therein, subsequent to which the film will be engaged by the teeth of the sprocket 30, with which it is held in contact by means of the first of the series of rollers 34. After the film has passed the sprocket 30, it will be engaged by the sprocket 31 against which it is caused to bear by the last of the rollers 34 and the film will now be transmitted to the guide member 45. It will further be obvious that, due to the simplicity of the exterior mechanism an operator will have no difficulty in properly threading the film, for the reason that it will only be necessary for him to disengage the hasp 38 from the pin 39, to move the rollers 40 outwardy and to allow the parts to assume the position shown in Figure 3. The film may then be passed over the sprockets 29, 30 and 31 and be inserted into the groove 46 (Figure 8) of the guide member 45. The rollers 40 may be now returned to their normal position in which they will be retained by means of the spring 42 and cam 41. A return of the bracket 37 and channel member to their normal positions will cause the film to also properly engage the sprockets 30 and 31 and thus it will be obvious that the said film will be effectively guided and that upon the parts assuming the position aforementioned the projector lens 20 will be in proper alignment with the spring 64.

Now with a view of moving the sprocket 30 intermittently and the sprockets 29 and 31 constantly and in proper ratio with respect to the first mentioned sprocket, it will be noted as in Figure 4 that the shaft 16 has attached to it within the casing 15 a worm wheel 47 which meshes with a worm 48. Extending longitudinally of the casing 15 is a single operating shaft 49 upon which the said worm 48 is mounted and thus, obviously, when the wheel 47 is turned the drive shaft 49 will be revolved. A pulley 50 is affixed to this shaft and has a cam groove 51 formed in its periphery. The teeth of a gear 52 extend within this groove and consequently as the drive shaft 49 is revolved the gear 52 will be intermittently rotated and due to the fact that this gear is affixed to a shaft 53, mounting the intermittent sprocket 30, it will be obvious that the latter will also be given the desired movement.

A second worm 54 is attached to the drive shaft 49 and engages a worm wheel 55 mounted upon a shaft 63 extending transversely of the casing 15 and this worm is connected in a manner hereinafter brought out with gears 56 and 57 respectively engaging the sprocket gears 58 and 59. These latter gears are secured to stub shafts 60 and 61 which extend beyond the casing and carry at their outer ends the take-up sprocket 31 and the feed sprocket 29 respectively. Thus, it will be seen that the rotation of the drive shaft in addition to intermittently moving the sprocket 30 also serves to constantly rotate the sprockets 29 and 31.

Now in order to form the necessary loops in the film 23 in advance and to the rear of the intermittent sprocket, as has been indicated at A and B in Figure 2, it will be seen that a knurled nut 62 is attached to the shaft 63 and that this shaft carries at a point in advance of the worm wheel 55, an arcuate gear 64, the movements of which are limited by stop pins 65. This gear engages a spur wheel 66 attached to a shaft 67, which latter is carried by and extends through the worm wheel 55 and to a point between the spokes 68 and 69 of the gears 56 and 57 respectively at which point it is flattened as has been indicated at 70.

Thus a rotation of the shaft 63 by means of the nut 62 will cause the gear 64 to be rocked and the spur wheel or gear 66 to be partially rotated. Accordingly, the shaft 67 will be turned and due to the flattened end portion of the same engaging the spokes 68 and 69 the gears 56 and 57, will be moved in opposite directions as has been clearly brought out in Figures 6 and 7. Extending between and having its ends connected with the spokes of these gears is a spring 71 which serves to return the gears to the position shown in Figure 6, when the shaft 67 is correspondingly moved and also serves to at all times cause the spokes to intimately engage the flattened end portion 70 of the shaft 67. Thus, it is obvious, that by the turning of this shaft a movement of the gears 56 and 57 is effected relative to each other and in opposite directions which will result in one of the gears 58 or 59 being moved in a clockwise direction, while the second of the same is moved in an anti-clockwise direction.

The film being threaded through the feeding and projecting mechanism and this mechanism being secured in place as has been described in connection with Figures 1, 2 and 3, it will be obvious that a rotation of the nut 62 will cause the parts to move from the position shown in Figure 6 to that indicated in Figure 7 which will result in the sprockets 29 and 31 being rotated in opposite directions and toward the sprocket 30 and thus the desired loops A and B will be formed without it being necessary for the operator to allow for the same when threading the film through the mechanism and in applying the same to the teeth of the sprockets.

Again referring to Figures 1 and 2 in which the feeding and receiving reels have been shown, it will be recalled that I have stated that the former is fixed with respect to its standard 26 by means of the set screw 27, while the latter is rotatably supported upon the standard 28. This latter supporting may be effected in any desired manner, but I prefer to accomplish the same by securing to each of the reels a stem 72 which is formed with a circumferential groove 73 in which a spring pressed pin 74 rides. This pin is carried by the standard 28 as has been shown in Figures 1 and 2 and it is obvious that the reel 25 is thus free to rotate. The film 23 is initially disposed within the reel 24 and this element is affixed to the standard 26 as aforestated. The end of the film passes through a slot formed in the periphery of the reel and after being threaded through the mechanism of the projector as aforedescribed the same is introduced into the track or slot 46 of the guide member 45. As will be seen in the figures aforementioned as well as in Figure 3, this guide member has its upper end swingingly supported by the stub shaft 60 of the sprocket 31, and the lower end of this member terminates in a spiral 75, the outer end of which bears against the inner edge face of the reel 25, due to the manner in which this reel is offset. Thus, upon the film being passed through the guide member, the end of the same may be brought to extend through a slot 76 in the reel 25 at which point it is attached by a clip 77. The reel 25 may now be rotated as in Figure 2 so that a certain portion of the film lies flush against the inner edge face of the reel and the projector may be operated.

During this operation the reel 24 remains stationary and the film will be caused to rotate upon itself by the pull exerted by the feed sprocket 29. The film will be fed past the intermittent sprocket and will pass along the guide member by virtue of the action exerted by the take-up sprocket 31 and due to the fact that the guide member bears against the inner edge face of the reel 25 and further due to the fact that the end of the film is attached to this reel the latter will be rotated and the film will be coiled layer upon layer within the interior of the same, it being noted that all of these layers will be properly formed incident to the fact that the guide member 45 is swingingly mounted and that in its initial position the end of the same is disposed in a vertical plane beyond that of its point of suspension. When the guide member 45 has been swung to the position indicated in dotted lines in Figure 3 incident to the building up of layers of film within the reel 25, the reel 24 will be empty and the operation of the projector will be stopped. The reel 25 is now thrust inwardly toward the casing 15 which movement is permitted incident to the action of the spring pressed pin 74 and the guide member 45 may now be swung upwardly in order to enable the operator to entirely remove the reel 25.

Thus the film will be withdrawn from the reel 24, projected and stored within the reel 25, but it will be seen that the re-winding operation is unnecessary due to the fact that the front end of the film extends through the slot 76 and is attached to the clip 77 and is thus ready to be projected by simply applying the reel 25 to the standard 26. Furthermore, it will be understood that, due to the improved construction presented in my projector, the conventional mechanism and expensive Geneva movement are entirely dispensed with and furthermore, all of the apparatus is extremely compact and readily manufactured.

At this time attention is invited to the detailed construction of the film 23 as has been disclosed in Figure 10. It will be noted, reference being had to this figure, that contrary to conventional construction the same is formed with merely a pair of feed perforations to each of the exposures. This is a particularly desirable feature when the apparatus is used by amateurs, in that no danger exists of the operator applying the film to the sprockets in such a manner that the exposures in the light opening will not register. Also, in the event that it is necessary to splice the film at any time, it will be obvious that it will be impossible for the film to jump during its projection, incident to the spliced portion being fed past the projecting sprocket.

Thus all of the objects of my invention are accomplished and it will be appreciated that numerous modifications of structure may readily be resorted to without in the least departing from the spirit of the invention as defined by my claims which are:

1. In a projector, the combination of a drive shaft, an intermittent feed sprocket operatively connected therewith, a worm carried by said shaft, a worm wheel driven by the latter, a pair of gear wheels operatively connected with said worm wheel and concentrically mounted on the shaft thereof and feed and take-up sprockets geared to said gear wheels.

2. In a projector, the combination with a single drive shaft of an intermittent feed sprocket operatively connected therewith, a worm and worm gear driven from said shaft, feed and take-up sprocket shafts having gears thereon, and a gear wheel drive for said sprocket shafts operatively connected with and mounted concentrically with said worm gear and engaging said sprocket shaft gears to rotate the same in opposite directions.

3. In a projector, the combination with a single drive shaft of an intermittent feed sprocket operatively connected therewith, a worm and worm gear driven from said shaft, feed and take-up sprocket shafts having gears thereon, and a gear wheel drive, consisting of a pair of independent rotatable gear wheels for said sprocket shafts operatively connected with and mounted concentrically with said worm gear and engaging said sprocket shaft gears to rotate the same in opposite directions.

4. In a projector, the combination of an intermittent feed sprocket, a feed sprocket feeding the film thereto, a take-up sprocket receiving the film from said intermittent sprocket, means for rotating all of said sprockets in one direction together and means for rotating said feed and take-up sprockets simultaneously in opposite directions with respect to one another while the intermittent feed sprocket is at rest to cause the simultaneous formation of loops at either side of the intermittent feed sprocket.

5. In a projector, the combination of an intermittent feed sprocket, means for driving the same, feed and take-up sprockets arranged adjacent to said intermittent feed sprocket, all of said sprockets being adapted to engage a film and means for moving the take-up sprocket in a direction reverse to the take-up movement to cause the formation of a loop between the same and the intermittent feed sprocket.

6. In a projecting machine, the combination of a feed sprocket and a take-up sprocket, mechanism normally rotating said sprockets in the same direction and means for imparting forward rotation to the feed sprocket and backward rotation to the take-up sprocket simultaneously to form two loops in the film.

7. A projecting machine including a pair of sprockets, gears connected with each of said sprockets, a pair of gears each engaging one of said last-named gears, means for normally rotating said pair of gears in unison and further means whereby said gears may be moved with respect to each other.

8. A projecting machine including a pair of sprockets, gears connected with each of said sprockets, a pair of gears each engaging one of said last-named gears, means for normally rotating said pair of gears in unison and further means whereby said gears may be moved with respect to each other and in opposite directions.

9. A projecting machine including a pair of sprockets, gears connected one with each of said sprockets, a further pair of gears connected one with each of said last-named gears, spokes forming a part of the second gears, means tending to normally align said spokes, means extending between said spokes whereby said gears may be moved in directions opposite to each other and means for normally holding said gears in unison with each other.

10. A projector including a pair of sprockets, gears connected one with each of said sprockets, a pair of gears meshing one with each of the teeth of said first-named gears, spokes forming a part of said second gears, a spring having its ends connected with said second gears whereby to normally tend to move the same to a certain position with respect to each other, a shaft, a flattened portion forming a part of said shaft and extending between the spokes of the second gears, means for turning said shaft whereby to move said gears in opposite directions with respect to each other and means for normally rotating both of said second gears in unison.

11. A projector including a pair of sprockets, gears connected one with each of said sprockets, a pair of gears meshing one with each of the teeth of said first-named gears, spokes forming a part of said second gears, a spring having its ends connected with said second gears whereby to normally tend to move the same to a certain position with respect to each other, a shaft, a flattened portion forming a part of said shaft and extending between the spokes of the second gears, a further gear connected to said shaft, a second shaft, means for turning said second shaft, an arcuate gear carried by said second shaft and adapted to engage the gear mounted upon the first-named shaft and means for normally rotating said sprockets in unison.

12. A projecting machine including a pair of sprockets, gears connected with said sprockets, a shaft adapted to move said gears in opposite directions, a further gear, said shaft being carried by said last-named gear, means for rotating said last-named gear, a second shaft carried by said last-named gear, means for turning said second shaft, an arcuate gear attached to said second shaft and a gear having its teeth meshing with said arcuate gear and being attached to said first-named shaft.

13. In a moving picture projecting machine, the combination with feed and take-up sprockets and an intermittent feed sprocket, of a drive mechanism and means in the driving connection to said sprockets for turning the feed and take-up sprockets in opposite directions to cause the film to fall into loops at opposite sides of the intermittent feed sprocket.

14. A device of the character specified in claim 13 wherein the means for moving the feed and take-up sprockets consists of a drive connection carried by a portion of the drive train and engaged between the gears respectively connected to the feed and take-up sprockets in such manner that upon turning the device said gears will be caused to turn in opposite directions to produce the desired loops.

15. In a device of the character specified in claim 13, feed and take-up sprockets driven respectively by two gear wheels between which a spring is inserted to cause them to return to position for threading the film preparatory to the spreading action of a cam device in the driving connection whereby the wheels are turned in opposite directions to form loops.

16. A projecting machine including an intermittent sprocket and feed sprocket and a take-up sprocket, means for rotating said sprockets, a bracket rockingly carried adjacent said sprockets and a plurality of rollers carried by said bracket and adapted to bear against said sprockets when the parts are in normal position, a spring-pressed hasp carried by the bracket, film engaging rollers for holding the film against the feed sprocket, a cam member supporting said rollers and a spring cooperating with the cam member.

Signed at New York in the county of New York and State of New York this 21st day of March A. D. 1923.

HENRY LUBÉ.